US012803388B2

(12) United States Patent
Poot Rodriguez et al.

(10) Patent No.: US 12,803,388 B2
(45) Date of Patent: Nov. 17, 2026

(54) OVERMOLDED ELECTRONIC CONTROLLER WITH INTEGRATED MOTOR BEARING HOLDER FOR A DRIVETRAIN ACTUATOR

(71) Applicant: Vitesco Technologies USA, LLC, Auburn Hills, MI (US)

(72) Inventors: David Poot Rodriguez, Tlaquepaque (MX); James D. Baer, Gurnee, IL (US); Edward Hribar, Palos Hills, IL (US)

(73) Assignee: Vitesco Technologies USA, LLC, Auburn Hills, MI (US)

( * ) Notice: Subject to any disclaimer, the term of this patent is extended or adjusted under 35 U.S.C. 154(b) by 248 days.

(21) Appl. No.: 18/662,644

(22) Filed: May 13, 2024

(65) Prior Publication Data

US 2025/0132640 A1 Apr. 24, 2025

Related U.S. Application Data

(60) Provisional application No. 63/592,009, filed on Oct. 20, 2023.

(51) Int. Cl.
*H02K 11/00* (2016.01)
*H02K 5/16* (2006.01)
*H02K 5/22* (2006.01)

(52) U.S. Cl.
CPC ......... *H02K 11/0094* (2013.01); *H02K 5/161* (2013.01); *H02K 5/225* (2013.01); *H02K 2205/09* (2013.01); *H02K 2211/03* (2013.01)

(58) Field of Classification Search
CPC ........ H02K 5/225; H02K 5/08; H02K 5/1732; H02K 11/33; H02K 2205/00
See application file for complete search history.

(56) References Cited

U.S. PATENT DOCUMENTS 5,668,422 A * 9/1997 Deynet .................. B60T 8/368 310/239
5,688,028 A * 11/1997 Kohno .................... B60T 8/368 303/119.2

(Continued)

FOREIGN PATENT DOCUMENTS

| | | |
|---|---|---|
| CN | 116345768 A | 6/2023 |
| EP | 0728645 A2 | 8/1996 |

(Continued)

OTHER PUBLICATIONS

European Search Report dated Jan. 29, 2025 for corresponding European Patent Application No. PCT/EP2022/065084.

*Primary Examiner* — Leda T Pham

(57) ABSTRACT

A smart actuator assembly having an overmolded electronics assembly, where the overmolded electronics assembly includes a printed circuit board (PCB), at least one terminal mounted to the PCB, a housing at least partially surrounding the PCB, the terminal protruding out of the housing, and at least one bearing holder integrally formed as part of the housing. The smart actuator assembly includes a motor subassembly, where the motor subassembly has a motor housing, a shaft at least partially extending into the motor housing, a rotor mounted to the shaft, and at least one bearing assembly mounted to the shaft adjacent the rotor. The overmolded electronics assembly is connected to the motor subassembly such that the bearing is at least partially disposed in the bearing holder.

14 Claims, 10 Drawing Sheets

(56) References Cited

U.S. PATENT DOCUMENTS

| | | | | |
|---|---|---|---|---|
| 10,811,923 | B2 | 10/2020 | Knospe | |
| 11,705,773 | B2 * | 7/2023 | Migita | H02K 5/1732 310/90 |
| 2005/0168085 | A1 * | 8/2005 | Ihata | H02K 5/1732 310/90 |
| 2018/0226861 | A1 * | 8/2018 | Palmer | H02K 9/18 |
| 2020/0037432 | A1 * | 1/2020 | Goatley | H02K 5/08 |
| 2021/0399606 | A1 * | 12/2021 | Schmezer | H02K 5/02 |

FOREIGN PATENT DOCUMENTS

| | | | |
|---|---|---|---|
| EP | 3819189 | A1 | 5/2021 |
| JP | H06225496 | A | 8/1994 |

* cited by examiner

OVERMOLDED ELECTRONIC CONTROLLER WITH INTEGRATED MOTOR BEARING HOLDER FOR A DRIVETRAIN ACTUATOR

CROSS-REFERENCE TO RELATED APPLICATIONS

This application claims the benefit of provisional application 63/592,009, filed Oct. 20, 2023. The disclosure of the above application is incorporated herein by reference.

FIELD OF THE INVENTION

The invention relates generally to an overmolded electronics assembly which is part of a smart actuator.

BACKGROUND OF THE INVENTION

Current architectures of smart actuators include an electronic assembly that physically and electrically connects to a motor through stator blades, a press fit connection, the leadframe, etc. The construction of the motor is typically independent of the electronic assembly and there are no structural connections to the rotor.

The motor construction includes a stator and a rotor fixed to a structural mechanical housing. This structural mechanical housing may be constructed using two or more parts (such as a metal/plastic bearing holder). This motor assembly is then assembled to the electronic assembly, where the electronic assembly may have a separate housing, such as an overmolded housing.

An electronics assembly having an overmolded housing in most applications is placed and screwed on the die cast housing motor back, the motor interfaces with the electronics assembly through three holes positioned where the stator male terminals are located. Typically, the electronics assembly having an overmolded housing does not provide structural support for the motor.

Current architectures of smart actuators require separate components which are used to assemble the motor and the electronic assembly, which creates many interfaces and increases the Mechanical Bill Of Materials part count.

Accordingly, there exists a need for a smart actuator assembly which overcomes the aforementioned drawbacks by reducing components and simplifying assembly.

SUMMARY OF THE INVENTION

In an embodiment, the present invention is an overmolded electronics assembly which also functions as a cover for an electric motor subassembly, where the cover also includes an integrated bearing holder to support one of the bearings of the electric motor subassembly. In an embodiment, the overmolded electronics assembly also functions as a snap-in vent holder.

The invention addresses the problem that the current smart actuator architecture faces due to the multiple interfaces that the component stack of the motor generates. The present invention addresses the typical motor construction stack by removing features from the structural motor housing and integrating the removed features to the overmolded electronics assembly.

In an embodiment, the present invention integrates an electronic assembly with a structural mechanical part of a motor assembly and a motor subassembly.

In an embodiment, the electronic assembly (which is double sided) includes an overmolded housing to create a structural mechanical part with features that support a motor subassembly and a snap-in vent assembly. This overmolded electronic assembly features several alignment features and support features that support structural parts of a motor (such as a bearing holder), sealing geometries (i.e., motor to connector, overmolding to motor housing), snap-in vent sealing geometry, supports for crimps, etc.

The motor subassembly has a metal housing with mounting features, such as apertures in each of the four corners, a fixed stator with blades, a fixed bottom bearing (with washer), a fixed shaft, a fixed rotor, a fixed upper bearing and a wave washer (installed prior to assembly with the electronic subassembly). All of these components are pre-assembled.

The overmolded electronics assembly is then assembled to the motor subassembly, and sealed with a wet seal or gasket and attached to the motor housing using any suitable process, such as crimping, screwing, riveting, etc.

Electrical contact between the electronics assembly and the motor housing (i.e., ground) is made through a conductive component connected to the electronics assembly and compresses against the metal motor housing. The electrical contact between the electronics assembly and the motor is achieved by female terminals attached to the electronics assembly, where the female terminals are attached to male blades from the stator.

In an embodiment, the overmolded electronics assembly functions as a cover, a snap-in vent holder, and a bearing holder. The overmolded electronics assembly provides structural stability to the rotor shaft, geometric alignment between parts, and electrical control for the motor (both power and rotational sensing).

The overmolded electronics assembly of the present invention reduces the number of parts stacked in a smart actuator, thus, the number of interfaces and the mBOM part count are reduced.

Due to the nature of the overmolding process, optimization of the electronics assembly space is achieved, potentially reducing the size of the actuator. Additionally, the electronic assembly is dense, reducing the overall footprint of the smart actuator assembly.

In an embodiment, the present invention is a smart actuator assembly having an overmolded electronics assembly and a motor subassembly. In an embodiment, the overmolded electronics assembly includes a printed circuit board (PCB), at least one terminal mounted to the PCB, a housing at least partially surrounding the PCB, the at least one terminal protruding out of the housing, a connector shroud mounted to the PCB, the connector shroud at least partially surrounded by the housing, the connector shroud surrounding one or more pins protruding from the PCB, and at least one bearing holder integrally formed as part of the housing.

In an embodiment, the motor subassembly includes a motor housing, a shaft at least partially extending into the motor housing, a rotor mounted to the shaft, and at least one bearing assembly mounted to the shaft and adjacent the rotor.

In an embodiment, the overmolded electronics assembly is connected to the motor subassembly such that the at least one bearing is at least partially disposed in the at least one bearing holder.

In an embodiment, the bearing holder includes a base portion, a circumferential side wall integrally formed with the base portion, a recess area surrounded by the base portion, and a mounting surface integrally formed with the base portion, the mounting surface is perpendicular to the circumferential side wall. In an embodiment, the bearing assembly is in contact with the mounting surface and surrounded by the circumferential side wall, and the shaft partially extends into the recess area.

In an embodiment, the bearing holder includes a wave washer mounted to the shaft such that the wave washer is disposed between the bearing assembly and the mounting surface. In an embodiment, the wave washer is compressed between and applies force to the bearing assembly and the mounting surface, facilitating proper alignment of the bearing assembly.

In an embodiment, the motor housing includes a base flange integrally formed as part of the motor housing, and a plurality of crimping features integrally formed as part of the motor housing. Each of the plurality of crimping features is in contact with a corresponding notch formed as part of the housing when the overmolded electronics assembly is assembled to the motor subassembly.

In an embodiment, a first recess portion is part of the motor housing and integrally formed with the base flange, and a second recess portion is part of the motor housing and adjacent the first recess portion. The second recess portion has a smaller diameter than the first recess portion.

In an embodiment a stator is located in the second recess portion such that the stator surrounds the rotor, and a connector blade connects to and extends from the stator. The connector blade is connected to the terminal when the overmolded electronics assembly is connected to the motor subassembly.

In an embodiment, at least one alignment feature is integrally formed as part of the housing, and an inner wall is integrally formed as part of the first recess portion of the motor housing. The alignment feature is in contact with the inner wall when the overmolded electronics assembly is connected to the motor subassembly.

In an embodiment, a vent holder is integrally formed as part of the housing, and an aperture is integrally formed as part of the vent holder. A vent assembly is connected to the vent holder such that the vent assembly is partially disposed in the aperture.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
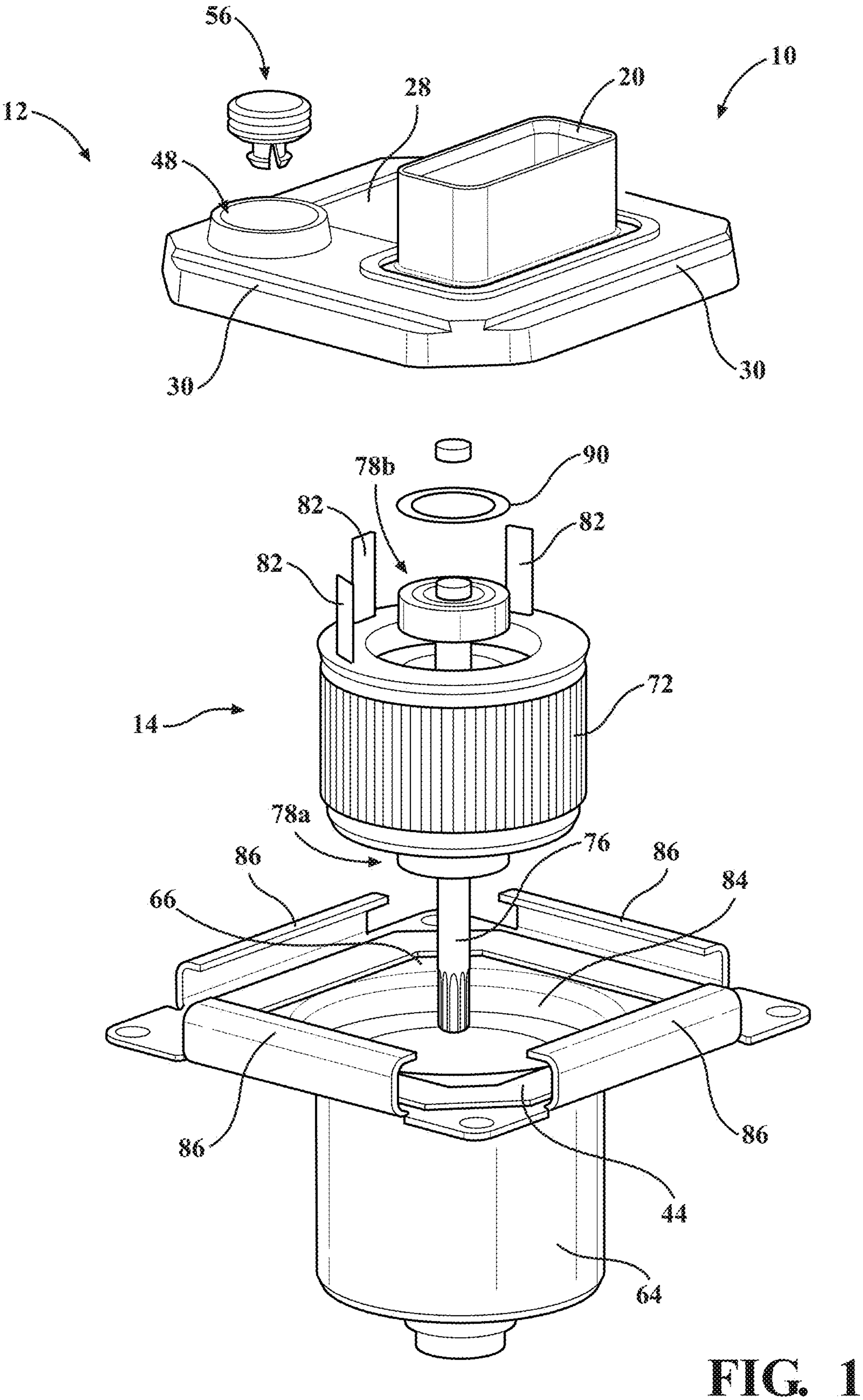
FIG. 1 is a partial exploded view of a smart actuator assembly having an overmolded electronics assembly, according to embodiments of the present invention.
Figure 2:
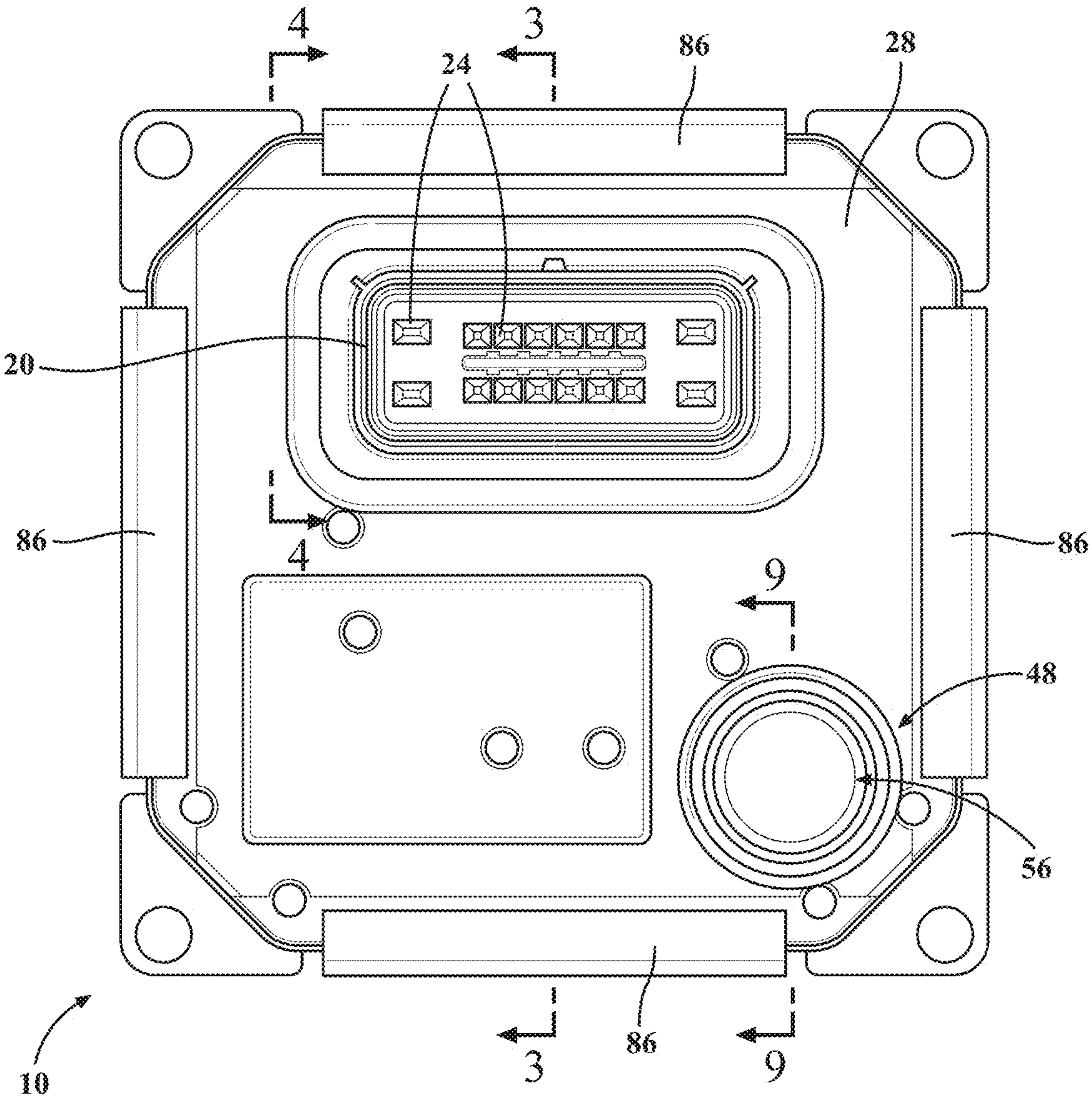
FIG. 2 is a top view a smart actuator assembly having an overmolded electronics assembly, according to embodiments of the present invention.
Figure 3:
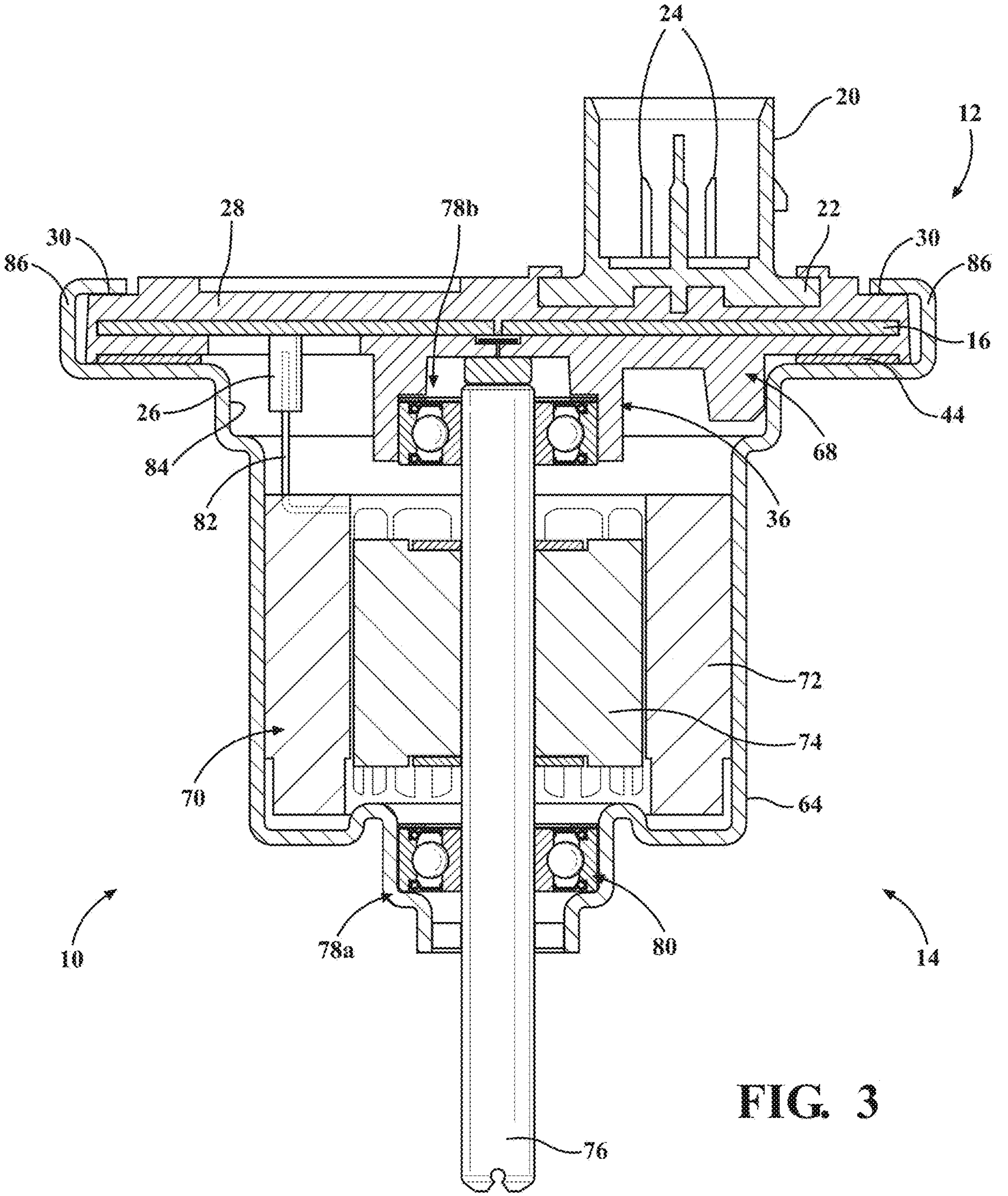
FIG. 3 is a sectional view taken along lines 3-3 of FIG. 2.

A smart actuator assembly having an overmolded electronics assembly according to the present invention is shown in FIGS. 1-3, generally at 10. The smart actuator assembly 10 includes an overmolded electronics assembly, shown generally at 12, and a motor subassembly, shown generally at 14.

Figure 6:
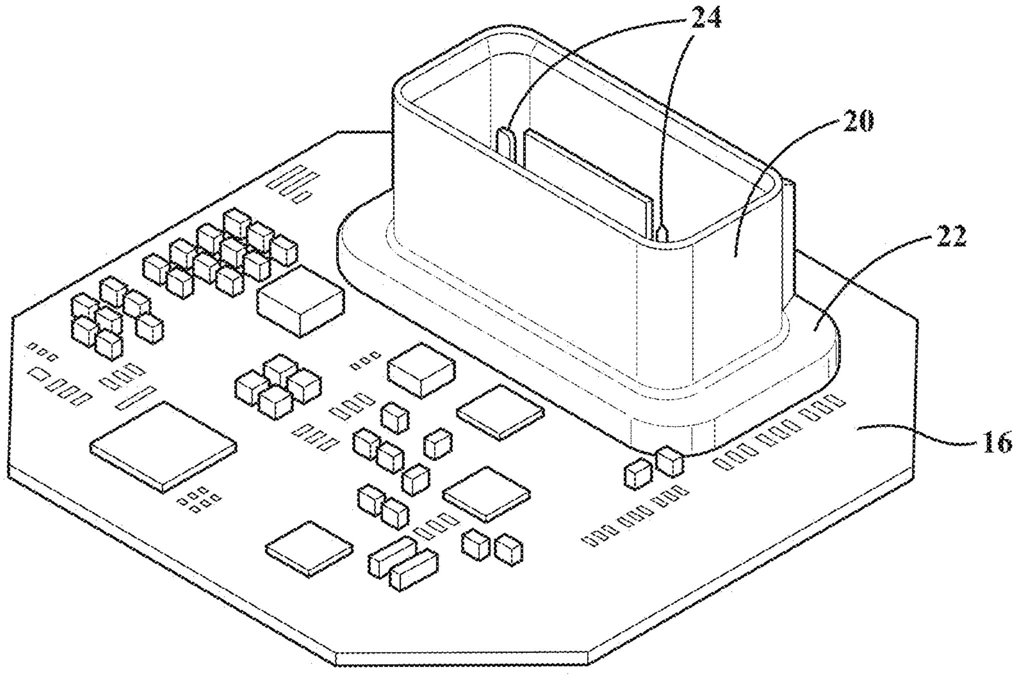
FIG. 6 is a perspective view of a printed circuit board which is part of a smart actuator assembly, according to embodiments of the present invention.
Figure 7:
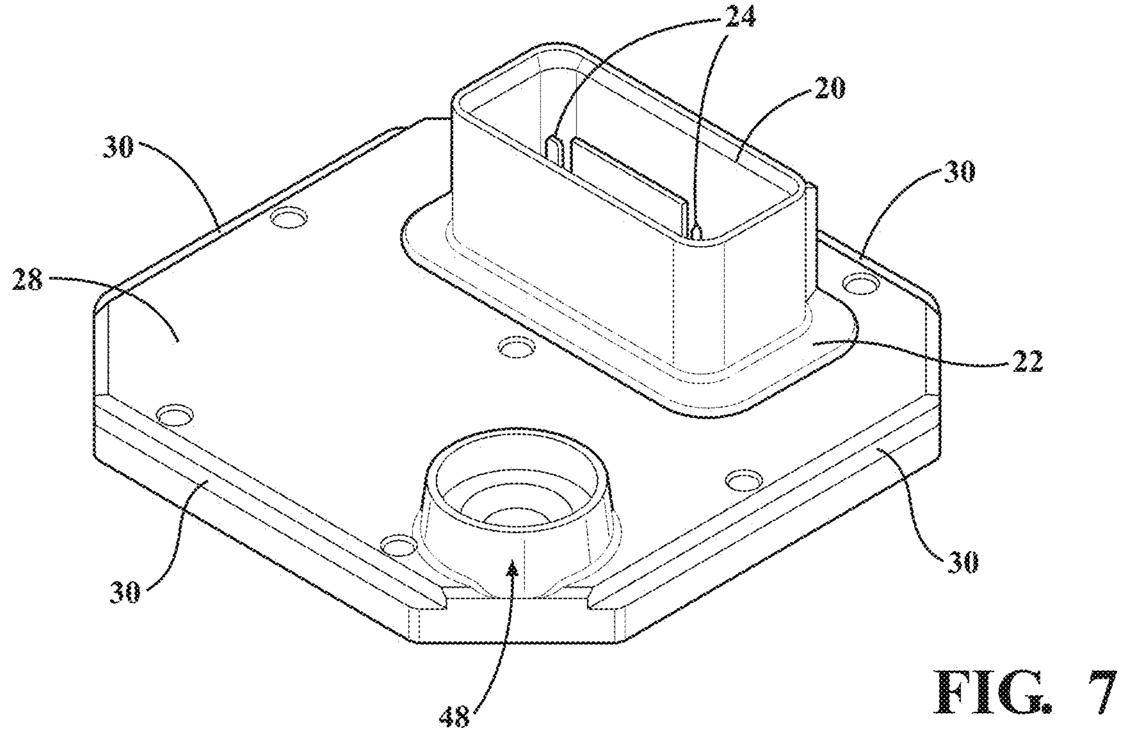
FIG. 7 is a first perspective view of an overmolded electronics assembly which is part of a smart actuator assembly, according to embodiments of the present invention.
Figure 8:
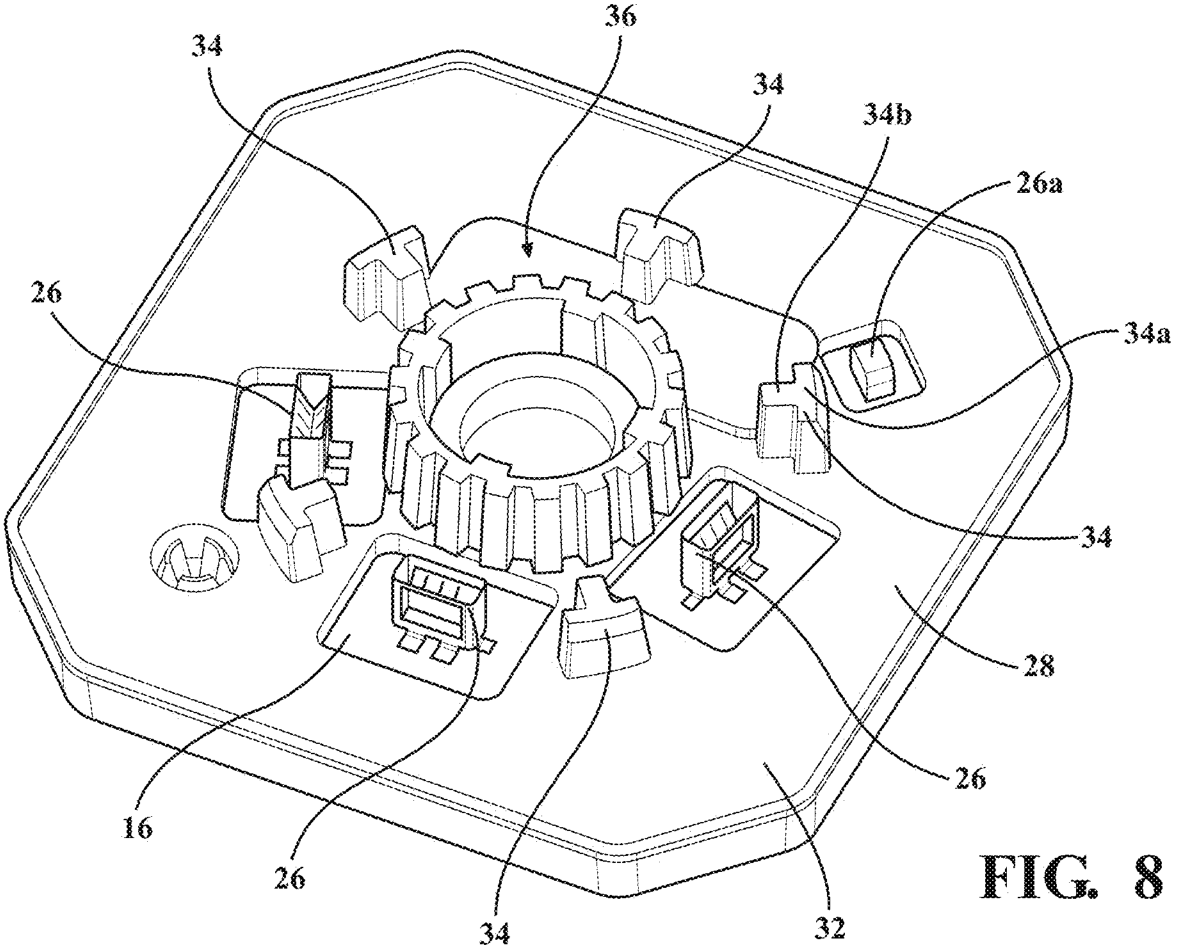
FIG. 8 is a second perspective view of an overmolded electronics assembly which is part of a smart actuator assembly, according to embodiments of the present invention.
Figure 9:
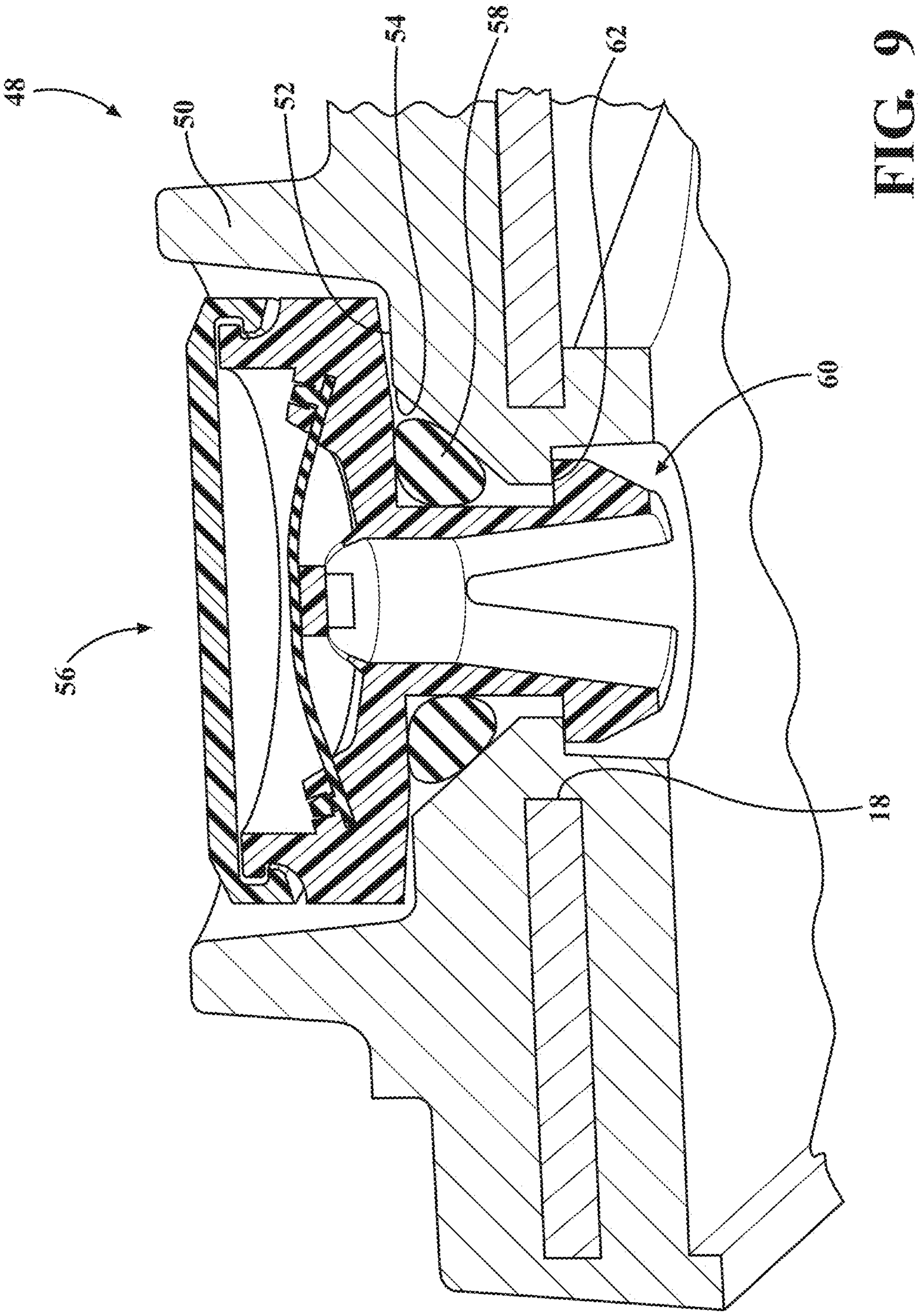
FIG. 9 is sectional view taken along lines 8-8 of FIG. 2.
Figure 10:
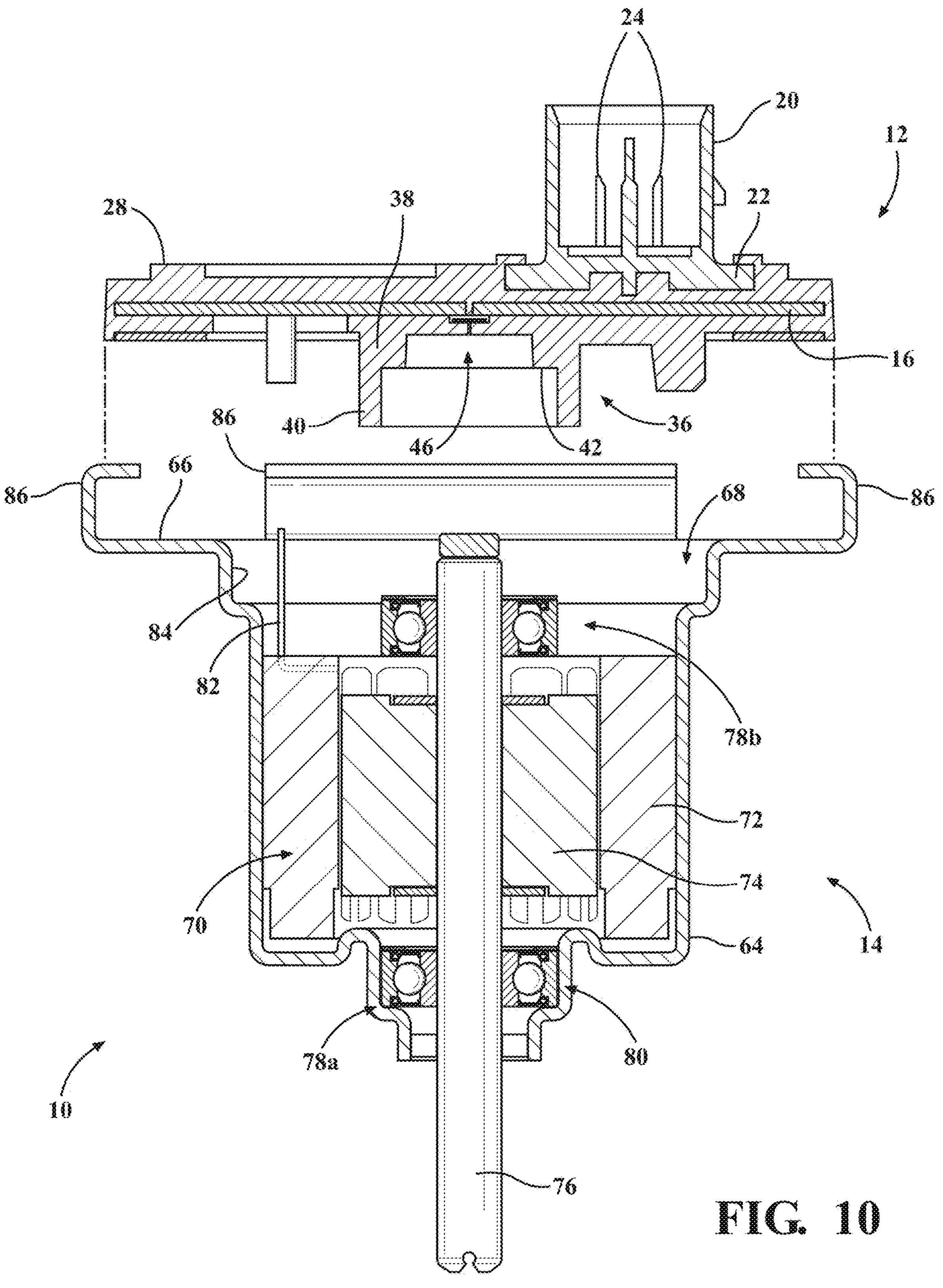
FIG. 10 is a partial exploded sectional view of an overmolded electronics assembly which is part of a smart actuator assembly, according to embodiments of the present invention.

Referring now to FIGS. 6-8, the overmolded electronics assembly 12 includes a printed circuit board (PCB) 16 having various circuitry, and a connector shroud 20 mounted to a first side of the PCB 16. The connector shroud 20 surrounds various pins 24 extending from the first side of the PCB 16. Extending from a second side of the PCB 16 is several terminals 26, which in the embodiment shown are female terminals 26. Similar to the terminals 26, also extending from the second side of the PCB 16 is a conductive component 26*a*. In the embodiment shown, the conductive component is a c-shaped spring which provides a grounding connection between the motor subassembly 14 and the PCB 16, but it is within the scope of the invention that the conductive component may be a pad, or any device suitable for providing a grounding connection between the motor subassembly 14 and the PCB 16.

Figure 4:
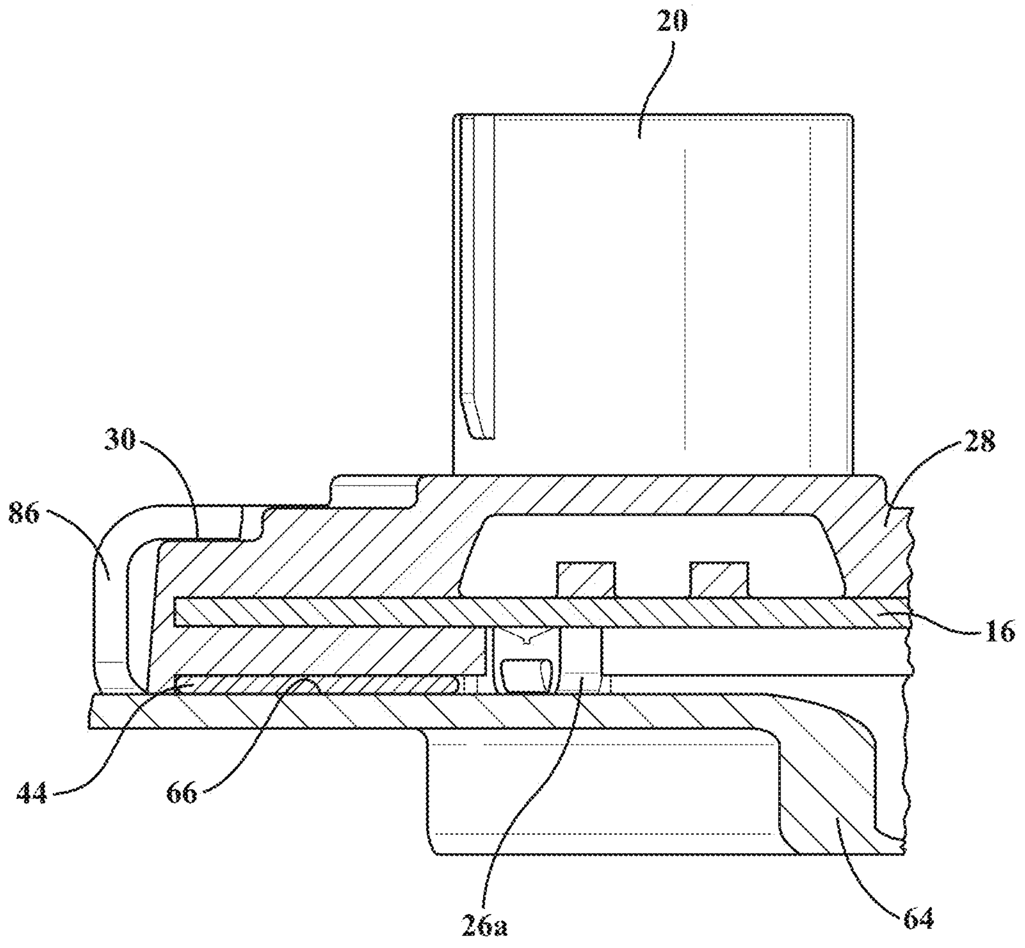
FIG. 4 is a sectional view taken along lines 4-4 of FIG. 2.
Figure 5:
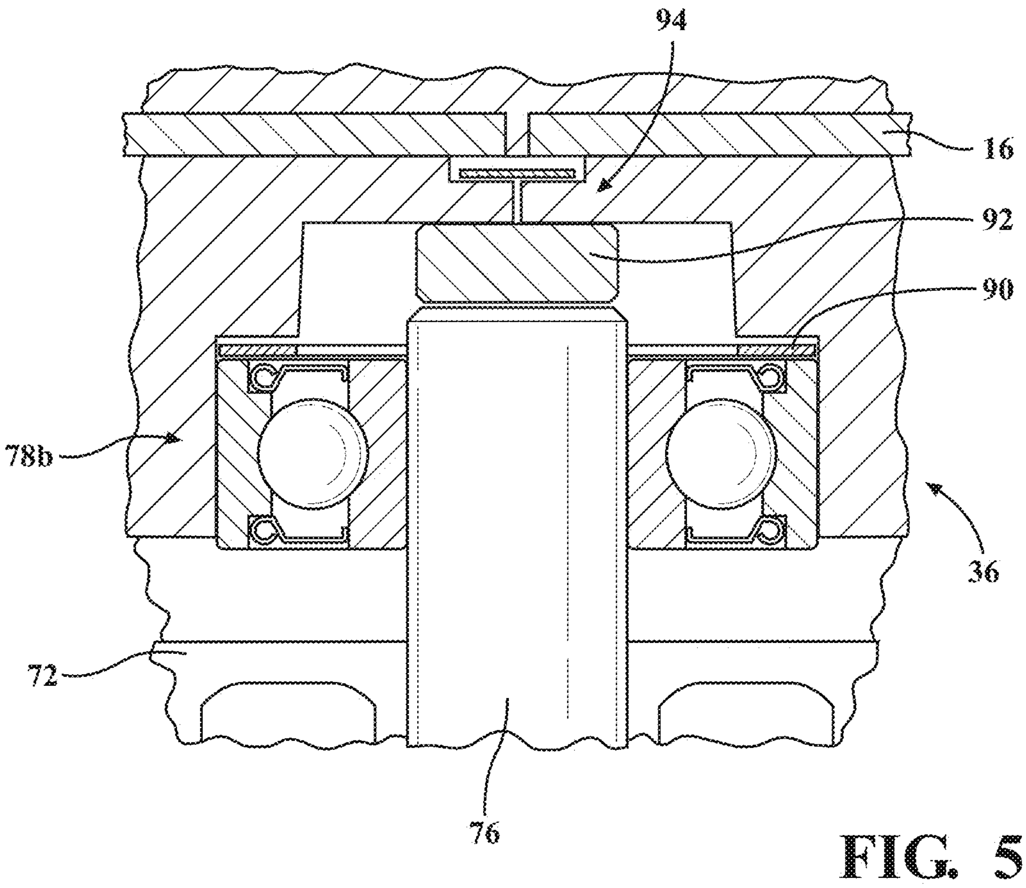
FIG. 5 is an enlarged sectional view of a portion of FIG. 3.

A housing 28 is overmolded around the PCB 16 and encases the circuitry mounted to the PCB 16. The connector shroud 20 and pins 24 are partially encased in the housing 28 and extend out of the housing 28. As shown in FIGS. 1, 3-4, and 10, the connector shroud 20 includes a flange portion 22, and a portion of the housing 28 is overmolded around the flange portion 22 to secure the connector shroud 20 to the housing 28. With specific reference to FIG. 8, portions of the PCB 16 near the terminals 26 and the conductive component 26*a* are exposed and are located outside of the housing 28. Referring to FIGS. 3-4, part of the housing 28 may be located underneath the connector shroud 20, which is achieved when the housing 28 is overmolded around the PCB 16. In an embodiment, portions of the housing 28 are located underneath the connector shroud 20 but are not in contact with the pins 24. The terminals 26 are substantially rectangular shaped, and have a cavity for receiving a connector blade, the function of which is described later. After the housing 28 is overmolded, there are several notches 30 formed as part of the housing 28, the function of which is also described later.

During the overmolding process, several alignment features 34 and a bearing holder, shown generally at 36, are integrally formed as part of the housing 28. In the embodiment shown, the alignment features 34 generally circumscribe the bearing holder 36, and each terminal 26 is disposed between two alignment features 34. The terminals 26, alignment features 34, and the bearing holder 36 all protrude from an inner surface 32 of the housing 28 in the same direction. Also, in the embodiment shown, the bearing holder 36 has a base portion 38, and integrally formed with the base portion 38 is a circumferential side wall 40 and a mounting surface 42, where the mounting surface 42 is perpendicular to the circumferential side wall 40. There is also a recess area, shown generally at 46, surrounded by the base portion 38. Each alignment feature 34 is generally t-shaped, having a first flange portion 34*a*, which is substantially perpendicular to a second flange portion 34*b*. Also during the overmolding process, a vent holder, shown generally at 48, is also integrally formed as part of the housing 28.

Referring to FIGS. 3, 5, and 8-10, the vent holder 48 includes a sidewall 50 and a support wall 52, which are both integrally formed as part of the housing 28. The vent holder 48 also includes a circumferential angular surface 54. When the smart actuator assembly 10 is assembled, a vent assembly, shown generally at 56, is disposed in the vent holder 48. A seal, which in this embodiment is an O-ring 58, is disposed in the vent holder 48 between the vent assembly 56 and the circumferential angular surface 54. The vent holder 48 also includes a circular aperture 60, and the PCB 16 has a circular aperture 18, where the circular aperture 60 and the circular aperture 18 are concentric relative to one another. The aperture 60 of the vent holder 48 is formed during the overmolding process, as mentioned above. Adjacent the circular aperture 60 is a connection surface 62 which is in contact with a snap-fit feature, shown generally at 62 of the vent assembly 56. During assembly, the vent assembly 56 is at least partially inserted into the vent holder 48 such that the snap-fit feature 60 of the vent assembly 56 is engaged with the connection surface 62.

The motor subassembly 14 includes a motor housing 64. In the embodiment shown, the motor housing 64 includes a base flange 66, and integrally formed with the base flange 66 is a first recess portion, shown generally at 68, and a second recess portion, shown generally at 70, where both recess portions 68,70 are cylindrical in shape, and the first recess portion 68 is larger in diameter compared to the second recess portion 70. As shown in FIG. 4, the conductive component 26*a* is in contact with the base flange 66, providing the grounding connection between the motor subassembly 14 and the PCB 16.

Disposed in the second recess portion 70 of the motor housing 64 is a stator 72, and the stator 72 surrounds a rotor 74, where the rotor 74 is mounted to a shaft 76. The shaft 76 is supported by a first bearing assembly, shown generally at 78*a*, and a second bearing assembly, shown generally at 78*b*. The first bearing assembly 78*a* is located in another recess portion, shown generally at 80, integrally formed as part of the motor housing 64.

Referring to FIGS. 1, 3, 5, and 10, the second bearing assembly 78*b* is in contact with a wave washer 90, and the wave washer 90 is disposed between the second bearing assembly 78*b* and the mounting surface 42. The wave washer 90 is compressed after assembly, and therefore applies force to the second bearing assembly 78*b*, facilitating proper stack-up of the bearing assemblies 78*a*,78*b* and the shaft 76. In an alternate embodiment, the wave washer 90 may be eliminated if the tolerances for the bearing assemblies 78*a*, 78*b* are sufficient.

Referring to the Figures generally, during assembly, the overmolded electronics assembly 12 is positioned such that the second bearing assembly 78*b* is disposed in the bearing holder 36 such that the circumferential side wall 40 surrounds the bearing assembly 78*b*, the wave washer 90 is disposed between the bearing assembly 78*b* and the mounting surface 42, and part of the shaft 76 extends into the recess area 46. As shown in FIGS. 1 and 3-4, there is also a seal 44 disposed between and in contact with the housing 28 and the motor housing 64, where the seal 44 minimizes or prevents dirt and debris from entering into the motor housing 64. Also, during assembly, several connector blades 82 of the stator 72 are inserted into a corresponding one of the terminals 26. More specifically, the ends of each of the first flange portions 34*a* is in contact with the inner surface of a circumferential wall 84 of the motor housing 64.

Referring to FIGS. 1-4, 7, and 10, the motor housing 64 also has several crimping features 86, which in the embodiment shown are several flanges integrally formed as part of the base flange 66 of the motor housing 64. The crimping features 86 are shown in the crimped position, but prior to assembly, the crimping features 86 are generally flat, similar to the base flange 66. During assembly, the crimping features 86 are crimped after the overmolded electronics assembly 12 is positioned as described above, such that at least a portion of each of the crimping features 86 contacts a corresponding one of the notches 30 of the housing 28, to secure the overmolded electronics assembly 12 in place. Although the crimping features 86 have been described, it is within the scope of the invention that the overmolded electronics assembly 12 and the motor subassembly 14 may be assembled using any other suitable type of connection/process, such as, but not limited to, welding, riveting, etc.

Once the overmolded electronics assembly 12 is connected to the motor subassembly 14 the vent assembly 56 may be assembled to the vent holder 56 as described above to provide proper venting of the smart actuator assembly 10.

Attached to an end of the shaft 76 is a magnet 92. As previously mentioned, part of the shaft 76 extends into the recess area 46. When the smart actuator assembly 10 is fully assembled, the magnet 92 on the end of the shaft 76 is located in proximity to a speed sensing element, shown generally at 94, where the speed sensing element 94 is mounted to the PCB 16. The speed sensing element 94 detects the rotational speed of the magnet 92, and therefore detects the rotational speed of the shaft 76.

Figure 11:
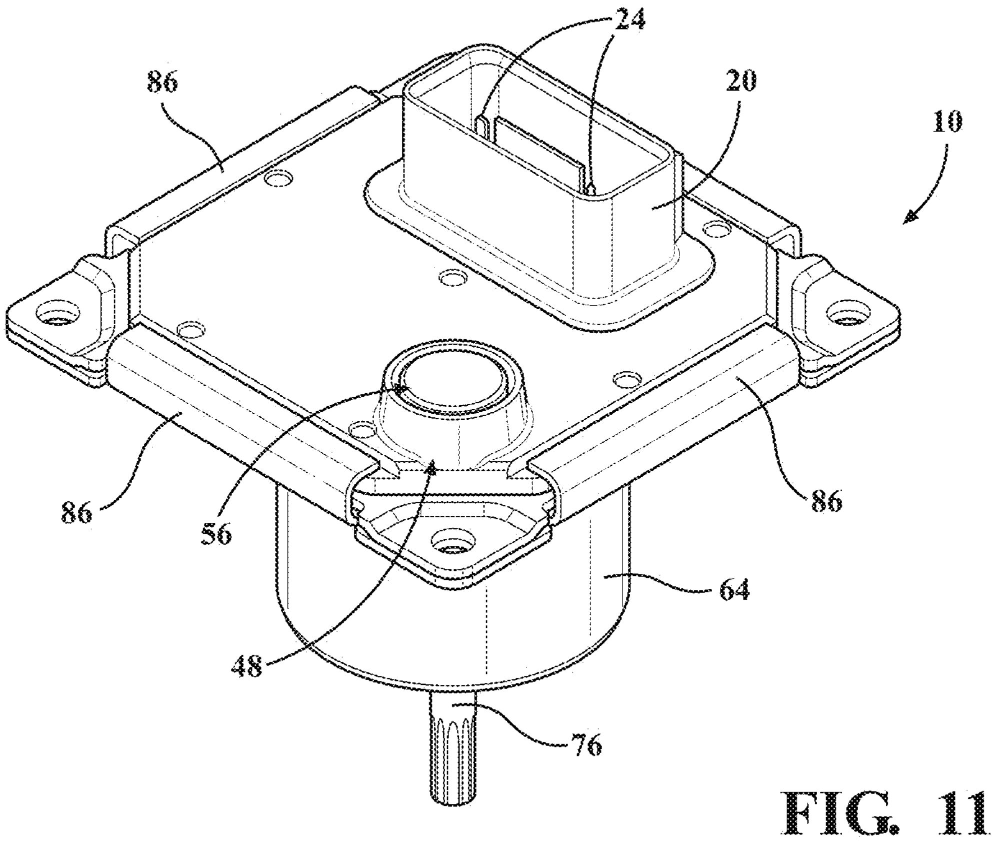
FIG. 11 is a perspective view of an alternate embodiment of a smart actuator assembly, according to embodiments of the present invention.
Figure 12:
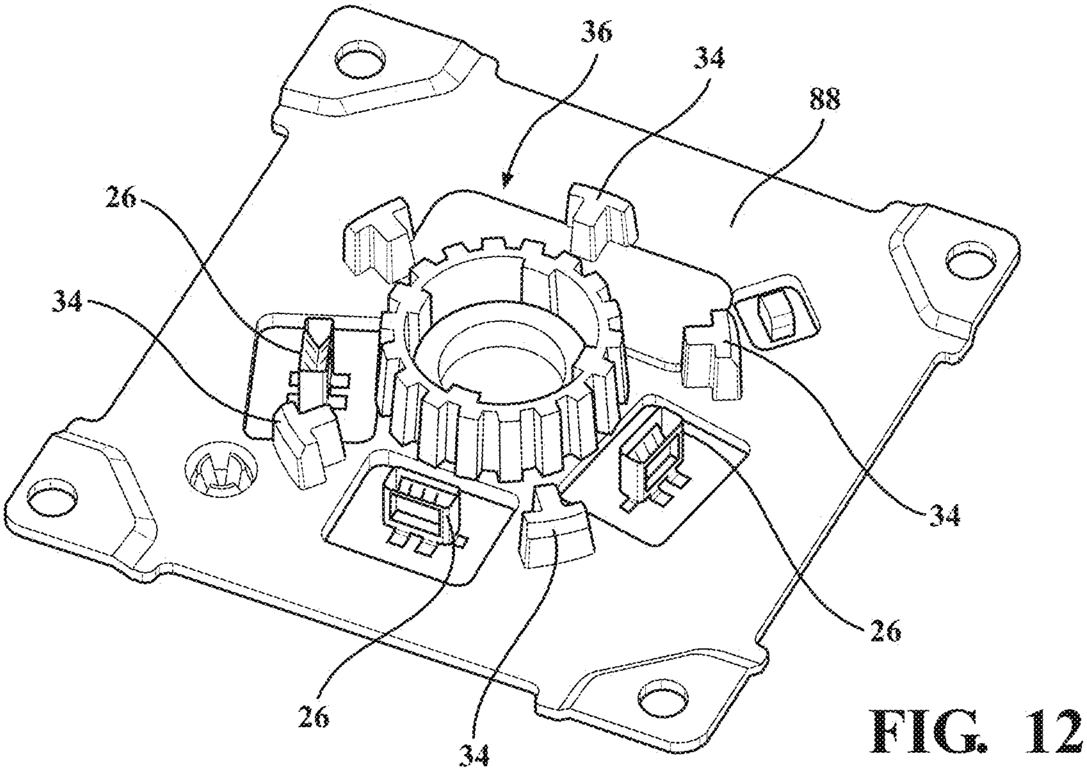
FIG. 12 is a bottom view of an overmolded electronics assembly which is part of an alternate embodiment of a smart actuator assembly, according to embodiments of the present invention.

An alternate embodiment of the smart actuator assembly 10 is shown in FIGS. 11-12. In this embodiment, the smart actuator assembly 10 includes a heat sink 88, where shape of the heat sink 88 substantially corresponds to the shape of the base flange 66, but does not have the crimping features 86. The heat sink 88 also includes apertures which allow the terminals 26, the alignment features 34, and the bearing holder 36 to protrude through the heat sink 88, as shown in FIG. 12.

Figure 13:
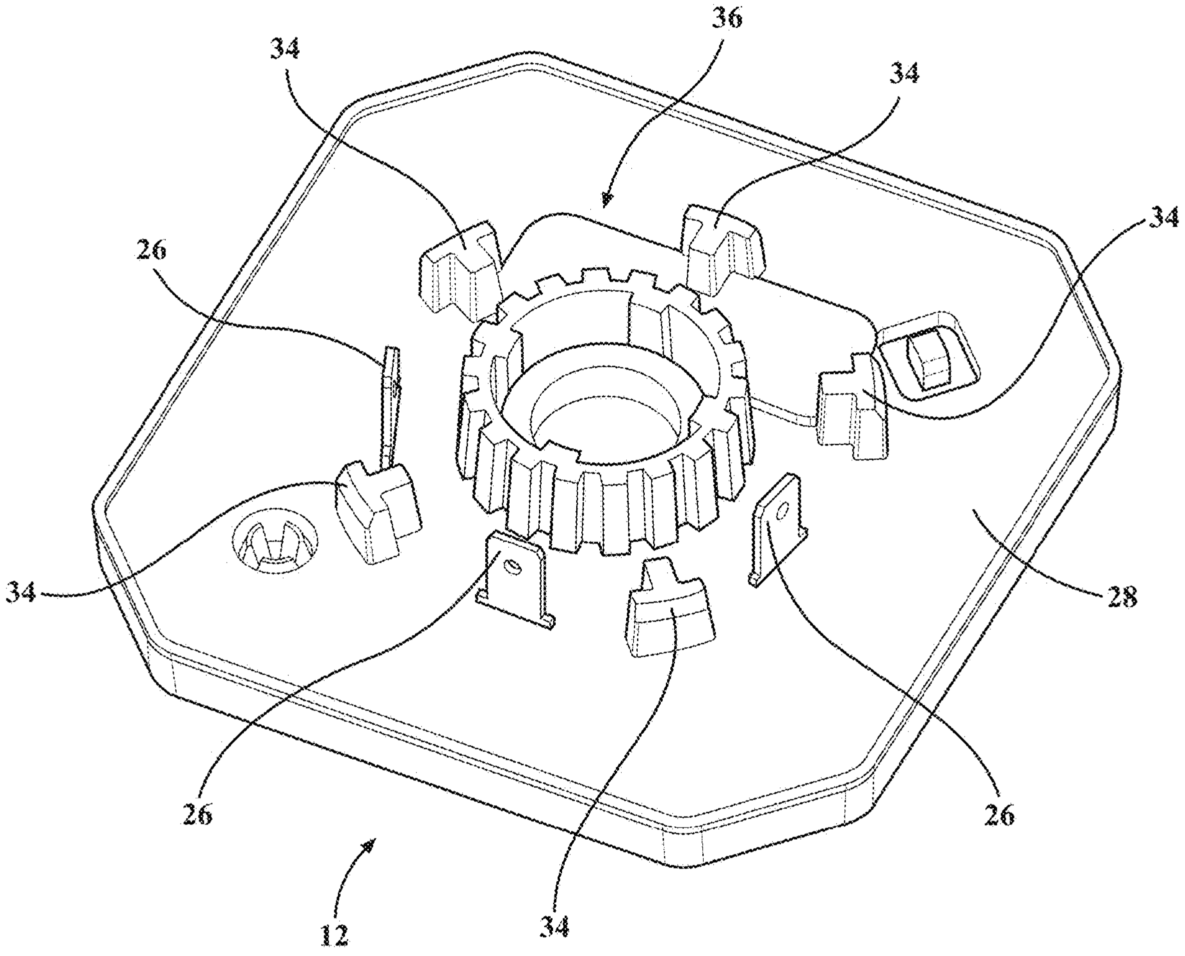
FIG. 13 is a perspective view of an overmolded electronics assembly which is part of another alternate embodiment of a smart actuator assembly, according to embodiments of the present invention.

Another embodiment of the overmolded electronics assembly 12 is shown in FIG. 13, with like numbers referring to like elements. However, in this embodiment, the terminals 26 are male and not female, and no portion of the PCB 16 is exposed.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An apparatus, comprising:

a smart actuator assembly, further comprising:

an overmolded electronics assembly, further comprising:

a printed circuit board (PCB);

a housing at least partially surrounding the PCB; and at least one bearing holder integrally formed as part of the housing;

a motor subassembly, further comprising:

at least one bearing assembly mounted to a shaft;

a motor housing;

a base flange integrally formed as part of the motor housing; and at least one crimping feature integrally formed as part of the motor housing such that the at least one crimping feature extends from the base flange, and the at least one crimping feature is in contact with the housing when the overmolded electronics assembly is assembled to the motor subassembly;

wherein the overmolded electronics assembly is connected to the motor subassembly such that the at least one bearing is at least partially disposed in the at least one bearing holder.

2. The apparatus of claim 1, the at least one bearing holder further comprising:

a base portion;

a circumferential side wall integrally formed with the base portion;

a recess area surrounded by the base portion; and a mounting surface integrally formed with the base portion, the mounting surface is perpendicular to the circumferential side wall;

wherein the at least one bearing assembly is in contact with the mounting surface and surrounded by the circumferential side wall, and the shaft partially extends into the recess area.

3. The apparatus of claim 1, further comprising:

a wave washer disposed between the at least one bearing assembly and the mounting surface;

wherein the wave washer is compressed between and applies force to the at least one at least one bearing assembly and the mounting surface, facilitating proper alignment of the at least one bearing assembly.

4. The apparatus of claim 1, further comprising:

at least one alignment feature integrally formed as part of the housing; and an inner wall integrally formed as part of the motor housing;

wherein the at least one alignment feature is in contact with the inner wall when the overmolded electronics assembly is connected to the motor subassembly.

5. The apparatus of claim 1, further comprising:

a stator located in the motor housing, the stator surrounding a rotor;

a connector blade connected to and extending from the stator; and at least one terminal mounted to the PCB, the at least one terminal protruding out of the housing;

wherein the connector blade is connected to the terminal when the overmolded electronics assembly is connected to the motor subassembly.

6. The apparatus of claim 5, further comprising:

a first recess portion integrally formed with the base flange; and a second recess portion adjacent the first recess portion, the second recess portion having a smaller diameter than the first recess portion;

wherein the stator is located in the second recess portion.

7. The apparatus of claim 1, further comprising:

a vent holder integrally formed as part of the housing;

wherein a vent assembly is connected to the vent holder.

8. A smart actuator assembly, comprising:

an overmolded electronics assembly, further comprising:

a printed circuit board (PCB);

at least one terminal mounted to the PCB;

a housing at least partially surrounding the PCB, the at least one terminal protruding out of the housing;

a connector shroud mounted to the PCB, the connector shroud at least partially surrounded by the housing, the connector shroud surrounding one or more pins protruding from the PCB;

at least one bearing holder integrally formed as part of the housing;

a motor subassembly, further comprising:

a motor housing;

a shaft at least partially extending into the motor housing;

a rotor mounted to the shaft; and at least one bearing assembly mounted to the shaft and adjacent the rotor;

a base flange integrally formed as part of the motor housing; and a plurality of crimping features integrally formed as part of the base flange, and each of the plurality of crimping features is in contact with a corresponding notch formed as part of the housing when the overmolded electronics assembly is assembled to the motor subassembly:

wherein the overmolded electronics assembly is connected to the motor subassembly such that the at least one bearing is at least partially disposed in the at least one bearing holder.

9. The smart actuator assembly of claim 8, the at least one bearing holder further comprising:

a base portion;

a circumferential side wall integrally formed with the base portion;

a recess area surrounded by the base portion; and a mounting surface integrally formed with the base portion, the mounting surface is perpendicular to the circumferential side wall;

wherein the at least one bearing assembly is in contact with the mounting surface and surrounded by the circumferential side wall, and the shaft partially extends into the recess area.

10. The smart actuator assembly of claim 9, further comprising:

a wave washer mounted to the shaft such that the wave washer is disposed between the at least one bearing assembly and the mounting surface;

wherein the wave washer is compressed between and applies force to the at least one bearing assembly and the mounting surface, facilitating proper alignment of the at least one bearing assembly.

11. The smart actuator assembly of claim 8, further comprising:

a first recess portion being part of the motor housing and integrally formed with the base flange; and a second recess portion being part of the motor housing and adjacent the first recess portion;

wherein the second recess portion has a smaller diameter than the first recess portion.

12. The smart actuator assembly of claim 11, further comprising:

a stator located in located in the second recess portion, the stator surrounding the rotor; and a connector blade connected to and extending from the stator;

wherein the connector blade is connected to the terminal when the overmolded electronics assembly is connected to the motor subassembly.

13. The smart actuator assembly of claim 11, further comprising:

at least one alignment feature integrally formed as part of the housing; and an inner wall integrally formed as part of the first recess portion of the motor housing;

wherein the at least one alignment feature is in contact with the inner wall when the overmolded electronics assembly is connected to the motor subassembly.

14. The smart actuator assembly of claim 8, further comprising:

a vent holder integrally formed as part of the housing; and an aperture integrally formed as part of the vent holder;

wherein a vent assembly is connected to the vent holder such that the vent assembly is partially disposed in the aperture.

* * * * *